US009637711B2

(12) United States Patent
Madsen et al.

(10) Patent No.: US 9,637,711 B2
(45) Date of Patent: May 2, 2017

(54) COMPOSITIONS AND METHODS FOR CLEANING WATER FILTRATION MEDIA (71) Applicant: Blue Earth Labs, LLC, Las Vegas, NV (US)

(72) Inventors: Dane H. Madsen, New York, NY (US); Jason E. Peters, Shawnee, KS (US); Jeffrey Schulhoff, Oklahoma City, OK (US); Jeffrey Bryan Schulhoff, Oklahoma City, OK (US)

(73) Assignee: Blue Earth Labs, LLC, Las Vegas, NV (US)

( * ) Notice: Subject to any disclaimer, the term of this patent is extended or adjusted under 35 U.S.C. 154(b) by 312 days.

(21) Appl. No.: 14/198,193

(22) Filed: Mar. 5, 2014

(65) Prior Publication Data

US 2014/0263075 A1 Sep. 18, 2014

Related U.S. Application Data (60) Provisional application No. 61/784,626, filed on Mar. 14, 2013.

(51) Int. Cl.
*C11D 7/08* (2006.01)
*C11D 3/39* (2006.01)
*C11D 11/00* (2006.01)
*C11D 3/04* (2006.01)
*C02F 1/00* (2006.01)

(52) U.S. Cl.
CPC ............ *C11D 3/3915* (2013.01); *C11D 3/042* (2013.01); *C11D 3/3942* (2013.01); *C11D 7/08* (2013.01); *C11D 11/0041* (2013.01); *C02F 1/004* (2013.01); *C02F 2303/16* (2013.01)

(58) Field of Classification Search
CPC C11D 3/39; C11D 3/3902; C11D 7/08; C02F 1/004; C02F 2303/16
See application file for complete search history.

(56) References Cited

U.S. PATENT DOCUMENTS

| | | | |
|---|---|---|---|
| 1,767,528 A | 6/1930 | Jones | |
| 2,769,787 A | 11/1956 | Diamond | |
| 3,887,498 A | 6/1975 | Kuhajek et al. | |
| 3,932,278 A | 1/1976 | Meidl et al. | |
| 3,968,048 A * | 7/1976 | Bolan ...................... | C09G 1/14 134/29 |
| 4,021,360 A * | 5/1977 | McLaughlin ............ | C11D 1/66 510/108 |
| 4,033,894 A * | 7/1977 | McLaughlin ............ | C11D 1/66 510/108 |
| 4,092,258 A * | 5/1978 | McLaughlin ............ | C11D 1/72 510/108 |
| 4,093,417 A * | 6/1978 | Heinlein .................. | D06L 1/16 510/357 |
| 4,104,163 A | 8/1978 | Grutsch | |
| 4,242,215 A * | 12/1980 | Smid ........................ | C11D 1/06 510/108 |
| 4,459,217 A * | 7/1984 | Bogie ...................... | A61K 8/23 252/186.1 |
| 4,806,259 A | 2/1989 | Amjad | |
| 4,895,658 A | 1/1990 | Amjad | |
| 5,005,520 A * | 4/1991 | Michael ................ | A01K 1/0152 119/171 |
| 5,630,883 A | 5/1997 | Steer et al. | |
| 5,776,876 A | 7/1998 | Garris | |
| 5,786,315 A * | 7/1998 | Sadlowski ........... | C11D 3/3761 510/225 |
| 5,876,990 A | 3/1999 | Reddy et al. | |
| 5,888,313 A | 3/1999 | West | |
| 5,895,781 A | 4/1999 | Neumiller et al. | |
| 5,931,172 A | 8/1999 | Steer et al. | |
| 6,139,756 A | 10/2000 | Fuchs et al. | |
| 6,309,470 B1 | 10/2001 | Schulhoff et al. | |
| 6,589,924 B2 | 7/2003 | Schmidt et al. | |
| 6,840,251 B2 | 1/2005 | Gill et al. | |
| 2002/0058605 A1 | 5/2002 | Schmidt et al. | |
| 2002/0094941 A1 | 7/2002 | Schulhoff et al. | |
| 2002/0132746 A1* | 9/2002 | Desenna ............... | C11D 3/0052 510/191 |
| 2003/0062315 A1 | 4/2003 | Cornelius et al. | |
| 2004/0050185 A1 | 3/2004 | Tibbets et al. | |
| 2004/0105781 A1 | 6/2004 | Polak | |
| 2006/0008915 A1 | 1/2006 | Noda et al. | |
| 2002/0058605 A1 | 5/2002 | Schmidt et al. | |
| 2002/0094941 A1 | 7/2002 | Schulhoff et al. | |
| 2002/0132746 A1* | 9/2002 | Desenna ............... | C11D 3/0052 510/191 |
| 2003/0062315 A1 | 4/2003 | Cornelius et al. | |
| 2004/0050185 A1 | 3/2004 | Tibbets et al. | |
| 2004/0105781 A1 | 6/2004 | Polak | |
| 2006/0008915 A1 | 1/2006 | Noda et al. | |

(Continued)

FOREIGN PATENT DOCUMENTS

| | | |
|---|---|---|
| CA | 2315137 A1 | 2/2001 |
| DE | 29805333 U1 | 6/1998 |
| EP | 0726934 B1 | 8/1996 |
| WO | WO 93/14181 A1 | 7/1993 |

OTHER PUBLICATIONS

International Preliminary Report on Patentability for International Patent Application No. PCT/US2014/020782, mailed Sep. 24, 2015, 9 pages.

(Continued)

*Primary Examiner* — Charles Boyer
(74) *Attorney, Agent, or Firm* — Withrow & Terranova, P.L.L.C.; Vincent K. Gustafson (57) ABSTRACT Compositions and methods for removing surface deposits in situ from filtration media contained in water filtration beds may include a solid acid component, a solid oxidizer, low temperature activator, a dessicant, an anti-caking agent, a pH indicator, a corrosion inhibitor, a surfactant, a chelating agent, and/or a defoaming agent. A granular acid component may include sodium bisulfate, and a granular oxidizing component may include at least one of sodium percarbonate, sodium perborate, potassium percarbonate, and potassium perborate. Compositions may be applied to top surface and/or subsurface regions of a filter bed, in wetted or dry form. A kit includes a container with dry composition and instructions or indicia for cleaning water filtration media using the composition.

30 Claims, 3 Drawing Sheets (56) References Cited

U.S. PATENT DOCUMENTS

| | | |
|---|---|---|
| 2006/0043028 A1 | 3/2006 | Reimann-Philipp et al. |
| 2008/0006589 A1* | 1/2008 | Reimann-Philipp .... C02F 1/004 210/794 |
| 2008/0314416 A1 | 12/2008 | Reimann-Philipp et al. |
| 2011/0278230 A1 | 11/2011 | Reimann-Philipp et al. |
| 2012/0040821 A1 | 2/2012 | Reimann-Philipp et al. |

OTHER PUBLICATIONS

Office Action for Canadian Patent Application No. 2845659 mailed Feb. 11, 2016, 4 pages.
Office Action for Canadian Patent Application No. 2845659 mailed Mar. 18, 2015, 3 pages.
International Search Report and Written Opinion for International Patent Application PCT/US2014/020782, mailed Jul. 22, 2014, 14 pages.
Wikipedia, "Sulfamic Acid" webpage, accessible at http://en.wikipedia.org/wiki/Sulfamic_acid, accessed on Apr. 9, 2014
Haarhoff et al. What simple media tests can tell you about filter problems and rehabilitation. Proceedings of the 2004 Water Institute of Southern Africa (WISA) Biennial Conference. May 2-6, 2004, p. 1202-1211.
Laiyu Chemical Co., Ltd., "Products: Sodium Percarbonate" webpage, accessible at http://laiyuchem.com.cn/e15.htm, accessed on Mar. 8, 2013.
Extended European Search Report for European Patent Application No. 14774704.2, mailed Nov. 4, 2016, 7 pages.

* cited by examiner

COMPOSITIONS AND METHODS FOR CLEANING WATER FILTRATION MEDIA

STATEMENT OF RELATED APPLICATION(S)

This application is a non-provisional of and claims priority to U.S. Provisional Patent Application No. 61/784,626 filed on Mar. 14, 2013. The contents of the foregoing patent application are hereby incorporated by reference herein, for all purposes.

TECHNICAL FIELD

The present invention is directed to a compositions and methods for cleaning granular water filtration media, such as sand, anthracite coal, activated carbon, ion exchange resins, and/or ceramic beads.

BACKGROUND OF THE INVENTION

Filtration is an essential step in treating drinking water and industrial water. Filtration is carried out to remove contaminants that may be introduced with source water and/or may be generated during a water treatment process. Large-scale filtration commonly involves passing water through granular filter media, such as various types of sand, anthracite coal, granular activated carbon or combinations thereof arranged in one or more layers within a filter media bed, or though media such as ion exchange resins and/or ceramic beads.

Contaminants removed during filtration accumulate within a granular filter media bed. Over time, this accumulation leads to increased filter backpressure (measured by increased head loss), increased turbidity of flow-through, or (in a worst case scenario) breakthrough of contaminants. Regular backwashing is commonly used to remove accumulated filtrate in an effort to maintain filter performance and capacity.

Filter media particles typically accumulate deposits of biological and non-biological material that cannot be removed by backwashing, and that can significantly interfere with the filter's function. To maintain acceptable filter performance and capacity, it is important to periodically remove surface deposits that are not removable by backwashing.

Depending on the water source and environmental conditions, surface deposits on the filter particles can consist primarily of organic matter (biofilm), metal oxides, and/or calcium carbonate scale. Surface deposits on filter particles can also be formed due to pretreatment steps, such as may utilize aluminum-based pre-oxidant compositions. Heavy fouling or scaling will eventually reduce filter performance, with consequences including higher backwash frequency, reduced flowrate, increased water turbidity, breakthrough of contaminants and/or a combination of the foregoing. If filter deposits are not removed, then filter performance will eventually decline below tolerable levels and filter media exchange becomes necessary.

Unfortunately, exchange of filtration media is very expensive—including not only labor costs and direct costs associated with purchasing filtration media, but also substantial indirect costs associated with filter downtime. Exchange of filtration media may not be a practical maintenance solution for a water treatment installation having a single filtration bed and that serves as an exclusive water source for particular consumers. As a result, there is a need for maintenance procedures that allow for the cleaning of surface deposits from filtration media, as an alternative to filter media replacement.

Traditional mechanical methods for filtration media cleaning have included aeration of filter beds during backwash, and spraying water on top of filter beds to disperse soft aggregates. Such methods are not suitable for removing persistent surface deposits such as biofilm and scale.

Traditional chemical treatments for filtration media having included washing filtration media strong acids and bases, sometimes in combination with surfactants. These chemical treatments can be satisfactory for certain types of contamination, such as calcium carbonate scale; however, mixed deposits, which include metal oxides and biological films, are either not removed efficiently or require highly corrosive and hazardous cleaning agents that are difficult to use and may leave residue not acceptable in drinking water processing installations. In certain instances aqueous solutions of strong acid or strong base have been applied to filtration media; however, the treatment liquid may flow too quickly through the filtration media for a cleaning reaction to be completed. To obtain desired cleaning performance, treatment liquid could be applied repeatedly (thus requiring vast amounts of treatment liquid), or treatment liquid could be circulated through the filtration media until the clearing reaction is completed (requiring specialized and expensive circulation equipment). These approaches, although presenting a potential alternative to extended plant shutdown for filter media replacement, do not offer an economical alternative to filter media replacement.

Additional filtration media cleaning methods and compositions are disclosed in U.S. Patent Application Publication No. 2008/0006589A1 to Reimann-Philipp, et al., entitled "Process for In-Situ Cleaning of Drinking Water Filtration Media." Such publication discloses application of a granular cleaner to water filtration media and then applying a granular or liquid activator embodying an activated oxygen donor to the water filtration media (with the granular cleaner preferably being wetted after application) to cause a chemical reaction between the granular cleaner, activator, and water filtration media, resulting in cleaning of the water filtration media. Preferred constituents of the granular cleaner include sulfamic acid (50-99 wt %), citric acid (0-10 wt %), phosphoric acid (0-10 wt %), corrosion inhibitor (0-10 wt %), free-flow additive (0-10 wt %), surfactant (0-10 wt %), and sodium bicarbonate (balance). Particularly preferred constituents of the activator include either 5-50% hydrogen peroxide, or 0.2-10% peracetic acid, or a combination of hydrogen peroxide and peracetic acid, with the balance being water. If the activator is in granular form, then the activator and cleaner may be mixed prior to application, but in a most preferred embodiment, the activator is applied as an aqueous solution to a granular cleaner present in a filtration bed. The granular cleaner can also be applied as a slurry.

Although the compositions and methods disclosed by Reimann-Philipp, et al. provide improved cleaning performance relative to the traditional mechanical and chemical methods outlined above, such compositions and methods include certain drawbacks. First, it can be difficult to ensure that correct proportions of cleaner and activator are consistently used. Second, it can be cumbersome and/or difficult to apply separate cleaner and activator components—and particular difficult to do so with uniformity. Third, the granular cleaner may be only partly soluble in water, thereby resulting in application problems. Fourth, it can be difficult to ensure the entire volume of filtration media with a filtration bed is cleaned, particularly if cleaner and activator may react rapidly with one another before penetrating an entirety of a filtration bed. Fifth, it can be cumbersome to monitor progress of a filtration bed cleaning process. Sixth, it can be costly or cumbersome to transport large volumes of liquid activator. Seventh, conventional cleaning methods utilizing hazardous chemicals requires personnel to undergo significant training and undertake hazard protection steps. Eighth, it can be challenging to avoid formation of foam and/or other waste products.

Given the foregoing, there remains a need for alternative cleaning compositions and methods with enhanced efficiency and/or convenience to present an alternative to media replacement and an alternative to existing in situ filter cleaning compositions and methods. It would also be desirable for cleaning methods to avoid or reduce formation of byproduct deposits that may be more durable than deposits initially sought to be removed by a filter media cleaning process.

SUMMARY

Compositions and methods disclosed herein include an acid component and an oxidizing component that in combination are useful in removing surface contaminants from filtration media contained in a water filter media bed. A dry composition may include a granular acid component comprising sodium bisulfate, and a granular oxidizing component comprising at least one of sodium percarbonate, sodium perborate, potassium percarbonate, and potassium perborate, optionally in combination with one or more of the following: a pH indicator component, a granular low temperature activator, at least one dessicant, at least one corrosion inhibitor, and at least one anti-caking agent. A composition as disclosed herein may further include at least one chelating agent and/or a defoaming agent. A kit may include a dry composition as disclosed herein contained in a sealed container and accompanied by instructions (or other indicia such as a Web address or QR code, that may be used to retrieve instructions) for removing contaminants from water filtration media in a filter media bed using the dry composition. A composition as disclosed herein may be applied to a filter media bed (e.g., on top or by injection), and may be applied in dry or wetted form.

In one aspect of the invention, a dry composition for use in removing surface contaminants from filtration media contained in a water filtration bed includes a granular acid component comprising sodium bisulfate; and a granular oxidizing component comprising at least one of sodium percarbonate, sodium perborate, potassium percarbonate, and potassium perborate. The composition may include one or more additional ingredients, including but not limited to a low temperature activator, a dessicant, an anti-caking agent, a pH indicator, a corrosion inhibitor, and a surfactant.

In another aspect of the invention, a kit for cleaning filtration media when present in a filter media bed may include a dry composition as disclosed herein contained in a substantially sealed container and accompanied by instructions (or other indicia such as a Web address or QR code, that may be used to retrieve instructions) for removing contaminants from water filtration media in a filter media bed using the dry composition.

In another aspect of the invention, a method for removing contaminants from water filtration media contained in a filter media bed includes applying to the filter media bed a composition comprising an acid component comprising sodium bisulfate; and an oxidizing component comprising at least one of sodium percarbonate, sodium perborate, potassium percarbonate, and potassium perborate. The composition may include one or more additional ingredients as disclosed herein. The composition may be applied in dry or wetted form, and the composition may be applied to various portions of a filter media bed along exterior surfaces or by injection into interior portions of a filter media bed.

In another aspect, a method of removing contaminants including calcium ions from water filtration media of a filter media bed includes multiple steps, including: analyzing the core sample to determine (i) an amount of at least one cleaning material required for substantially complete removal of surface contaminants from the core sample and (ii) an amount of at least one chelating agent for sequestering a desired amount of calcium ions from the core sample; and utilizing results of the analyzing step to calculate (a) an amount of at least one cleaning material required for substantially complete removal of surface contaminants from the entire filter media bed and (b) an amount of at least one chelating agent for sequestering a desired amount of calcium ions from the entire filter media bed. The desired amount of calcium ions to be sequestered from the filter media bed may comprise substantially all calcium ions present in the filter media bed. Such method may further include applying to the filter media bed the at least one cleaning material in an amount substantially equal to the calculated amount of at least one cleaning material, and applying to the filter media bed the at least one chelating agent in an amount substantially equal to the calculated amount of at least one chelating agent. The at least one cleaning material and the at least one chelating agent may be blended.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Other aspects, features and embodiments of the invention will be more fully apparent from the ensuing disclosure and appended claims.

DETAILED DESCRIPTION

The present includes compositions and methods for removing surface deposits in situ from filtration media contained in water filtration beds. Compositions and methods disclosed herein are particularly suitable for in situ cleaning of water filtration media beds used in drinking water treatment systems utilizing NSF certified constituents.

In a preferred embodiment, the invention is directed toward a cleaning process for the cleaning of all types of granular water filtration media, such as sand, gravel, manganese greensand, anthracite coal, granular activated carbon (GAC), ion exchange media, and/or ceramic beads.

"In-situ cleaning" as disclosed herein in application to water filtration media refers to cleaning of filtration media while such media is contained in a filter media bed.

Certain embodiments as disclosed herein are directed to a dry composition for use in removing surface contaminants from filtration media contained in a water filter media bed, the composition comprising: a granular acid component comprising sodium bisulfate; and a granular oxidizing component comprising at least one of sodium percarbonate, sodium perborate, potassium percarbonate, and potassium perborate. Such composition may optionally include any one or more of the following: one or more additional granular acids, one or more additional granular oxidizing components, at least one pH indicator component, at least one granular low temperature activator component, at least one dessicant, at least one anti-caking agent, at least one surfactant, at least one anti-corrosion agent. In preferred embodiments, components of the dry composition are pre-mixed (i.e., mixed prior to packaging and transportation to a point of use).

Providing a dry composition that is premixed and packaged prior to transportation to the point of use presents numerous advantages over prior multi-part cleaning compositions that are shipped in separate containers and combined at the point of use when applied to filtration media of a water filter media bed. One advantage is that correct proportions of granular acid component and granular oxidizing component (as well as any other components of the composition) are ensured. Another advantage is that use of a single pre-mixed composition simplifies the process of applying cleaning material to a filter bed—and particularly in trying to apply such material uniformly. Still another advantage is that shipping granular solid material may reduce transportation costs and concerns about sloshing or spilling of liquids.

Sodium bisulfate ($NaHSO_4$), also known as sodium hydrogen sulfate, is an acid salt that is soluble in water to form soluble ions according to the following chemical equation: $NaHSO_4(aq) \rightarrow (Na^+) + (H^+) + (SO_4^{2-})$. When this acid salt is applied to water filtration media and wetted (e.g., dissolved in water), the resulting hydrogen ions ($H^+$) react with inorganic deposits such as calcium carbonate according to the following reaction: $CaCO_3 + 2(H+) \rightarrow CO_2 + (Ca^{+2}) + H_2O$. In comparison to solid acid components (e.g., sulfamic acid) used in prior in situ filtration media cleaning compositions, sodium bisulfate exhibits significantly improved solubility in water.

Sodium percarbonate ($2Na_2CO_3 \cdot 3H_2O_2$) is an adduct of sodium carbonate and hydrogen peroxide, and is a colorless, crystalline, hygroscopic and water-soluble solid. Sodium percarbonate has an active available oxygen content which is equivalent to 27.5% $H_2O_2$. When in contact with water, sodium percarbonate slowly reacts to form hydrogen peroxide and sodium carbonate according to the following reaction: $2Na_2CO_3 \cdot 3H_2O_2 \rightarrow 2Na_2CO_3 + 3H_2O_2$. When applied to water filtration media, the hydrogen peroxide from the percarbonate reaction oxidizes organic molecules in the water. These organic molecules tend to act as binders for fouling agents on surfaces of filter media and other water-contacted surfaces. Oxidation of these organic molecules facilitates their release and promotes cleaning of the water filtration media.

Potassium percarbonate ($K_2C_2O_6 \cdot H_2O$) is a granular water-soluble solid that reacts similarly to sodium percarbonate when in contact with water.

Sodium perborate is a white, water soluble chemical compound with the chemical composition $NaBO_3$. It crystallizes as the monohydrate, $NaBO_3 \cdot H_2O$, trihydrate, $NaBO_3 \cdot 3H_2O$ and tetrahydrate, $NaBO_3 \cdot 4H_2O$ forms. The elementary structural unit of sodium perborates is a dimer anion $B_2O_4(OH)_4^{2-}$, in which two boron atoms are joined by two peroxo bridges in a chair-shaped 6-membered ring, and the simplistic $NaBO_3 \cdot nH_2O$-type formulas are just a convenient way to express the average chemical composition. Unlike sodium percarbonate, sodium perborate is not simply an adduct with hydrogen peroxide, and it does not contain an individual $BO^{3-}$ ion. Rather, there is a cyclic dimer anion $B_2O_4(OH)_4^{2-}$, in which two boron atoms are joined by two peroxo bridges in a chair-shaped 6-membered ring. This makes the substance more stable, and safer for handling and storage. The formula of the sodium salt is thus $Na_2H_4B_2O_8$. Sodium perborate releases oxygen rapidly at temperatures over 60° C. Sodium perborate undergoes hydrolysis in contact with water, producing hydrogen peroxide and borate.

Potassium perborate ($KBO_3 \cdot nH_2O$) is a white, water soluble chemical compound with the chemical composition that reacts similarly to sodium perborate when in contact with water.

It is noteworthy that the reaction of sodium percarbonate to form sodium carbonate and hydrogen peroxide, and the reaction of sodium perborate with water to form borate and hydrogen peroxide, occur fairly slowly and entails significant bubbling. Potassium percarbonate and potassium perborate behave similarly. In the context of cleaning granular water filtration media, the bubbling inherent to this reaction of sodium percarbonate, sodium perborate, potassium percarbonate, or potassium perborate is believed by the inventors to be beneficial by locally agitating filtration media and promoting greater effective contact area between cleaning components and the filtration media and/or contaminants. The relatively slow release of hydrogen peroxide may also be beneficial in cleaning large-volume filtration beds, since hydrogen peroxide may continue to be released as the oxidizing component migrates through the filtration bed. This slow release of hydrogen peroxide may therefore help increase average peroxide concentration in a filter media bed, by avoiding a situation where acid and oxidizing components might otherwise react with one another before penetrating an entirety of the filtration bed.

In certain embodiments, sodium bisulfate and at least one of sodium percarbonate, sodium perborate, potassium percarbonate, and potassium perborate are present in the dry composition in a ratio of from about 8:1 to about 15:1 by weight of sodium bisulfate relative to at least one of sodium percarbonate and sodium perborate. In certain embodiments, the dry composition comprises at least about 50%, 55%, 60%, 65%, 70%, 75%, 80%, 85%, 90%, 91%, 92%, 93%, 94%, or 95% (w/w) sodium bisulfate. In certain embodiments, the dry composition comprises at least about 2%, 3%, 4%, 5%, 6%, 7%, 8% 9%, 10%, 11% 12%, 13% 14%, 15%, 16%, 17% 18%, 19%, 20%, 22%, or 24% (w/w) sodium percarbonate, sodium perborate, potassium percarbonate, and/or potassium perborate, (in combination if provided together). In certain embodiments, the composition comprises at least about 80-85 wt % sodium bisulfate and at least about 5-14 wt % of sodium percarbonate and/or sodium perborate. In certain embodiments, the composition comprises at least about 85-90 wt % sodium bisulfate and at least about 6-12 wt % sodium percarbonate and/or sodium perborate. In certain embodiments, the composition comprises at least about 90-93 wt % sodium bisulfate and at least about 7-10 wt % sodium percarbonate and/or sodium perborate. In certain embodiments, the composition comprises at least about 90 wt % sodium bisulfate and at least about 7 wt % sodium percarbonate and/or sodium perborate. When at least one low temperature activator is present in the dry composition, in certain embodiments the low temperature activator is present in the composition in a ratio of from about 1:1 to about 4:1 by weight of sodium percarbonate and/or sodium perborate relative to low temperature activator. In certain embodiments, low temperature activator mass fraction may in a range of from 0-20%, 0-15%, 0-10%, or 2-10% (w/w).

In certain embodiments, compositions disclosed herein contain both sodium percarbonate and sodium perborate. In certain embodiments, compositions disclosed herein contain sodium percarbonate without sodium perborate. In certain embodiments, compositions disclosed herein contain sodium perborate without sodium percarbonate.

Certain embodiments include granular low temperature activators suitable for conversion of liquid hydrogen peroxide to peracetic acid at relatively low temperatures typically experienced by water treatment facilities (e.g., temperatures within a range of from about 5° C. to about 30° C.). Such activators may convert hydrogen peroxide into other more aggressive oxidizers such as peracetic acid. Several granular low temperature activators that might be used include: tetraacetylethylenediamine (TAED), sodium nonanoyloxy-benzenesulfonate (NOBS), and sodium 2-[[(4-sulfophe-noxy)carbonyl]oxy]ethyl ester (DECOBS). An exemplary reaction showing conversion of TAED to peracetate is shown below.

In certain embodiments, a solid composition as disclosed herein may include an anti-caking agent such as (but not limited to) sodium aluminosilicate and calcium silicate. An anti-caking agent may be present in a solid composition in a mass fraction range of from 0-3%, 0-1%, or 0-1% (w/w). In certain embodiments, one or more free flow additives (e.g., fumed silicas) that adsorb to granules of the solid composition may be provided to inhibit clumping, and are NSF certifiable for use in drinking water processing installations. A free-flow additive may be present in a solid composition in a mass fraction range of from 0-3%, 0-1%, or 0-1% (w/w). In certain embodiments, a solid composition is preferably in the form of a free-flowing powder having an average particle size of 0.5 mm or less.

In certain embodiments, solid compositions as disclosed herein may include one or more corrosion inhibitors—i.e., inhibitors for protecting exposed metal surfaces from corrosion by the acid component. Corrosion inhibitors useful for inclusion in a granular composition as disclosed herein can be selected from the group of nitrogen containing organic compounds, such as amines, quaternary ammonium compounds, heterocyclic nitrogen compounds, urea, thiourea, amide, or mixtures thereof. Further specific examples of inhibitors include Inhibitor 60S, commercially available from Thoma, Inc. and Rodine 102, from Parker Amchem.

In certain embodiments, solid compositions as disclosed herein may include one or more surfactants for reducing surface tension and enhancing contact of the composition with filtration media. Surfactants useful for inclusion in a granular composition as disclosed herein may be selected from the group consisting of anionic, cationic, non-ionic and amphoteric surfactants in granular form. Useful anionic surfactants include, for example, alkali metal salts, ammonium salts, amine salts, aminoalcohol salts, fatty acid salts. Additional preferred surfactants are isopropanol and isobutanol. NSF certifiable surfactants for use in drinking water processing installations are preferred.

Figure 4A:
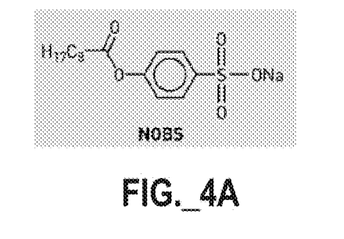
FIG. 4A illustrates the chemical structure of sodium nonanoyloxybenzenesulfonate (NOBS), which may be used as a low temperature activator in compositions and methods according to certain embodiments.
Figure 4B:
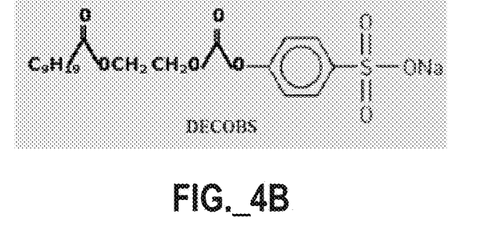
FIG. 4B illustrates the chemical structure of sodium 2-[[(4-sulfophenoxy)carbonyl]oxy]ethyl ester (DECOBS), which may be used as a low temperature activator in compositions and methods according to certain embodiments.

In certain embodiments, solid compositions as disclosed herein may include one or more a pH indicator components. In certain embodiments, a pH indicator component is arranged to exhibit at least one change in color responsive to Chemical structures for NOBS and DECOBS are shown in FIGS. 4A and 4B, respectively.

Since sodium bisulfate, sodium percarbonate, and sodium perborate are hygroscopic, solid compositions including any of these components are preferably transported and stored in substantially sealed containers. In certain embodiments, a solid composition as disclosed herein may include a dessicant material such as (but not limited to) anhydrous sodium sulfate. A dessicant may be present in a solid composition in a mass fraction range of from 0-3%, 0-1%, or 0-1% (w/w).

change in pH within an acidic pH range. In certain embodiments, a pH indicator is arranged to undergo a color change within a pH range of between 1 and 3. One example of a desirable pH indicator is S 580 Pylaklor Bright Blue, manufactured by PYLAM Products Company, Inc. Such indicator is yellow when present in a fluid having pH below 1.8, but turns blue when present in a fluid having pH above 2.3. A pH indicator may be present in a solid composition in a mass fraction range of from 0-2%, 0-1%, or 0-0.5%, 0-0.25%, 0-0.1%, 0.05%, or 0.02% (w/w).

In one embodiment, a cleaning composition comprises components and mass fractions as identified in the following Table I.

TABLE I

| Component | Mass Fraction (w/w) |
|---|---|
| Sodium bisulfate (NaHSO$_4$) | 50-95% |
| Sodium percarbonate (2Na$_2$CO$_3$•3H$_2$O$_2$); | 2-20% |
| Sodium perborate (NaBO$_3$•$n$H$_2$O); | |
| Potassium percarbonate (K$_2$C$_2$O$_6$•$n$H$_2$O); and/or | |
| Potassium perborate (KBO$_3$•$n$H$_2$O) | |
| Low temperature activator | 0-20% |
| Dessicant | 0-3% |
| Anti-caking agent | 0-3% |
| pH indicator (colorant) | 0-3% |
| Corrosion inhibitor | 0-10% |
| Surfactant | 0-10% |

As will be readily understood from the indicated mass fraction ranges, all components having a mass fraction range with a lower value of 0 may be optional components.

In one embodiment, a cleaning composition comprises sodium bisulfate (82-88%), sodium percarbonate, sodium perborate, potassium percarbonate, and/or potassium perborate, (5-8%), low temperature activator (1.5-6%), corrosion inhibitor (1-2%), surfactant (~1%), dessicant (~1%), anti-caking agent (~1%), and pH indicator (0.05%). In another embodiment, a cleaning composition comprises sodium bisulfate (86-90%), sodium percarbonate, sodium perborate, potassium percarbonate, and/or potassium perborate, (6-9%), low temperature activator (1.5-6%), dessicant (~1%), anti-caking agent (~1%), and pH indicator (0.05%). In certain embodiments, the pH indicator may be omitted. Other combinations of constituents and/or mass fractions thereof may be employed. In certain embodiments, a cleaning composition may embody a cleaning component, and may be mixed with or otherwise used in conjunction with at least one chelating agent or component as described in greater detail below.

Compositions as disclosed herein may optionally include one or more additional granular acids (e.g., citric acid, phosphoric acid, or other acids in solid form), one or more additional granular oxidizing components, and/or other additives providing functional or cosmetic properties.

In certain embodiments, when filtration media contains deposits including moderate to high levels of calcium, treatment of the filtration media with a composition as described hereinabove may form calcium sulfate deposits on the filtration media. Formation of calcium sulfate deposits is undesirable, since calcium sulfate may be generally more durable (i.e., harder to remove) than other forms of calcium or calcium-containing deposits. In order to mitigate problems with formation of calcium sulfate deposits in filtration media, one or more chelating components suitable for binding polyvalent metal ions (including Ca$^{2+}$) may be incorporated into (e.g., blended into) solid compositions as disclosed herein. Chelants (also known as chelating agents and sequestrants) typically include organic molecules that react with metal ions to form ring structures that incorporate the metal ion within the organic molecule in order to bind the metal in order to prevent or reduce other reactions involving the metal.

Examples of chelating components or agents that may be incorporated into solid compositions according to certain embodiments as disclosed herein include: acrylic copolymers (including but not limited to polyacrylate), ethylenediaminetetraacetic acid ("EDTA") and its salts, nitrilotriacetic acid ("NTA") and its salts, gluconic acid, sodium gluconate, and sodium glucoheptonate (also known as sodium heptonate). Additional compositions known to be effective as chelating agents and that may be used in solid compositions according to certain embodiments include various phosphonates, polyphosphates, lignin sulfonates, and citric acid.

In certain embodiments, a solid composition as disclosed herein may contain at least one chelating agent such as AQUATREAT® AR 540 Dry, which is a copolymer of acrylic acid and sulfonated monomers available from Akzo Nobel Surface Chemistry (Chicago, Ill., USA).

In embodiments, a solid composition as disclosed herein may contain at least one chelating agent in an amount of 20-50 wt % or more (possibly as high as 50-60 wt % in some instances).

An optimal amount of chelating agent present in a solid composition as disclosed herein may depend on the amount of calcium deposits present in filtration media. In certain embodiments, cleaning of filtration media may be preceded by analysis and calculation steps to determine the amount of chelating agent required to achieve desired (e.g., 100%) sequestration of calcium ions present in filtration media contained a filter bed.

In certain embodiments, a composition as disclosed herein may be applied in ranges of 0.05 to 12, or 1 to 11, or 2-10 lbs. composition per cubic foot of water filtration media.

In certain embodiments, backwashing of a water filtration bed may be performed immediately prior to a filter cleaning operation using a composition as disclosed herein.

In certain embodiments, a composition as disclosed herein may be applied in dry form to a top surface of filtration media contained in a water filtration bed. In certain embodiments, water is preferably maintained in the filter bed at a level just above the filtration media top surface. In certain embodiments, water may be added to the top of a filter (e.g., via a hose, sprayer, or other conduit(s)) following application of the composition to the filter bed. When the composition contacts water, the composition becomes soluble and starts to migrate through the filter bed via gravity and mass transfer mechanisms.

In certain embodiments, a composition as disclosed herein may be combined with water and applied in wetted form (to filtration media contained in a water filtration bed. In certain embodiments, a dry composition may be mixed with water to form a slurry that may be applied to filtration media. In certain embodiments, a dry composition may be mixed with water to form a solution that may be applied to filtration media. In certain embodiments, wetted (e.g., slurry or solution) forms of the composition may be applied to a top surface of a filter media bed and/or injected into one or more subsurface regions of the filter media bed.

After the composition is applied to the filtration media (whether in solid or wetted form), the composition is preferably maintained in the filtration bed for an extended time termed a "resting period" or a "soaking period." In certain embodiments, a resting period may be selected from one of the following ranges: at least about 8 hours, at least about 12 hours, at least about 24 hours, 8-72 hours, 12-64 hours, 18-36 hours, or 24-48 hours. In certain embodiments, periodically during the resting period, the filter bed may be injected with air (e.g., using an air scouring apparatus, if present). An air scour apparatus is a series of air conduits arranged to blow compressed air into a water filtration bed to dislodge loose contaminants, thereby enabling such contaminants to be flushed from the system filter (e.g., during a backwash cycle). After the resting period, the filter is preferably rinsed and/or backwashed. In certain embodiments, effluent from backwashing is treated with a neutralizing chemical (e.g., including but not limited to sodium hydroxide) to raise the pH of the effluent. In embodiments wherein the cleaning composition includes a pH indicator, such indicator may be useful during the neutralization process. A pH indicator component is preferably arranged to exhibit at least one change in color responsive to change in pH within an acidic pH range. In certain embodiments, color of effluent may be monitored during backwashing (e.g., using a colorimetric sensor, or human observation) to determine presence or absence of color attributable to the pH indicator component, and either conducting or terminating treatment of effluent may be performed responsive to the color monitoring.

In certain embodiments, cleaning may be preceded by an analysis and calculation steps to determine the amount of composition required to achieve a desired degree of cleaning of filtration media contained in a filter bed. An analysis step may include taking a representative core sample from the filtration media, the sample having a known volume, and measuring the amount of cleaner required for substantially complete removal of the surface contaminants from the filtration media in the sample. A calculation step may include extrapolating the measured amount to the amount required for the whole filter bed by multiplying the measured amount of composition required by the ratio of filtration bed volume/sample volume. Preferably, a core sample is taken in an area of maximum (or at least average) contamination and represents a cylindrical sample extending from the top to the bottom of the filtration bed. Adjusting the amount of composition used to the respective contamination conditions provides the process of the invention with a significant economic advantage, since use of excess composition may be avoided, thereby reducing the cost of the cleaning materials as well as the cost of disposing any unreacted composition. Furthermore, less backwashing is required, reducing the time required for rinsing and thus the time of the overall cleaning process.

Although the preceding sampling, analysis, and calculation steps may be used to determine a suitable amount of cleaning agent to be used for cleaning a particular filter bed, the same sample (or a different sample if desired) may be used in conjunction with analogous analysis and calculation steps to determine a suitable amount of chelating agent required to achieve desired (e.g., 100%) sequestration of calcium ions present in filtration media contained in the filter bed. An analysis step may include measuring the amount of calcium present in a representative core sample, and measuring the amount of chelating agent required for substantially complete sequestration of calcium ions from the filtration media in the sample. A calculation step may include extrapolating the measured amount of chelating agent to sequester calcium ions in the sample to the amount present in the whole filter bed by multiplying the measured amount of chelating agent required for sequestering calcium in the sample by the ratio of filtration bed volume/sample volume.

In certain embodiments, one or more cleaning agents may be blended with one or more chelating agents for a specific filtration bed to be cleaned, with the amounts of the one or more cleaning agents and the one or more chelating agents being determined (i.e., customized) according to the above-referenced sampling, analysis, and calculation steps performed with reference to the specific filtration bed. In certain embodiments, customized blending (following sample, analysis, and calculation steps) may be performed at an end use facility containing the specific filtration bed to be cleaned, following shipment of cleaning agent and chelating agent compositions that are separately packaged. In other embodiments, customized blending (following sampling, analysis, and calculation steps) may be performed at a facility remotely located relative to the filtration bed ("point of use"), and the customized blend may be packaged and shipped to the point of use to permit the customized blend to be used for cleaning the filtration bed.

In certain embodiments, multiple solid compositions containing different ratios of cleaning agent(s) and chelating agent(s) as disclosed may be pre-blended and packaged, and packages of specific blends may be selected for use depending on the amount of calcium present in a filter bed. For example, different solid composition blends may include cleaning agent(s) and chelating agent(s) in ratios of 10:1, 8:1, 6:1, 5:1, 4:1, 3:1, 2.5:1, 2:1, 1.5:1, 1:1, and/or any other desirable ratios, and such blends may be packaged and shipped to a point of use for cleaning filtration media.

In certain embodiments, a cleaning composition and/or chelating composition as disclosed herein may include at least one solid defoaming agent to beneficially reduce the amount of foam produced during a filtration media cleaning process. By reducing the levels of foam during a filtration bed cleaning process, the side walls of the filtration bed remain free of foam build-up, especially if the foam is allowed to dry during the resting period (e.g., at least about 8 hours, at least about 12 hours, at least about 24 hours, 8-72 hours, 12-64 hours, 18-36 hours, or 24-48 hours) while the composition is maintained in the filtration bed prior to rinsing and/or backwashing of the filtration bed. In certain embodiments, solid defoaming agents may include oil-based or silicon-based defoaming compositions on carrier particles. In certain embodiments, a solid defoaming agent may include SAF-166 solid defoamer produced by Silichem (Richmond Hill, Ontario, Canada). In certain embodiments, the active ingredient of a solid defoamer may be present in a cleaning composition and/or chelating composition in an amount of from 0.001 wt % to 5 wt %.

In certain embodiments, a cleaning and/or chelating composition may comprise components and mass fractions as identified in the following Table II.

TABLE II

| Component | Mass Fraction (w/w) |
|---|---|
| Sodium bisulfate ($NaHSO_4$) | 48-95% |
| Sodium percarbonate ($2Na_2CO_3 \cdot 3H_2O_2$); Sodium perborate ($NaBO_3 \cdot nH_2O$); Potassium percarbonate ($K_2C_2O_6 \cdot nH_2O$); and/or Potassium perborate ($KBO_3 \cdot nH_2O$) | 2-20% |
| Chelating agent | 0-50% or 20-50% |
| Defoaming agent | 0-5% |
| Low temperature activator | 0-20% |
| Dessicant | 0-3% |
| Anti-caking agent | 0-3% |
| pH indicator (colorant) | 0-3% |
| Corrosion inhibitor | 0-10% |
| Surfactant | 0-10% |

As will be readily understood from the indicated mass fraction ranges, all components having a mass fraction range with a lower value of 0 may be optional components.

Further details of exemplary embodiments are explained below in connection with FIGS. 1-3.

Figure 1:
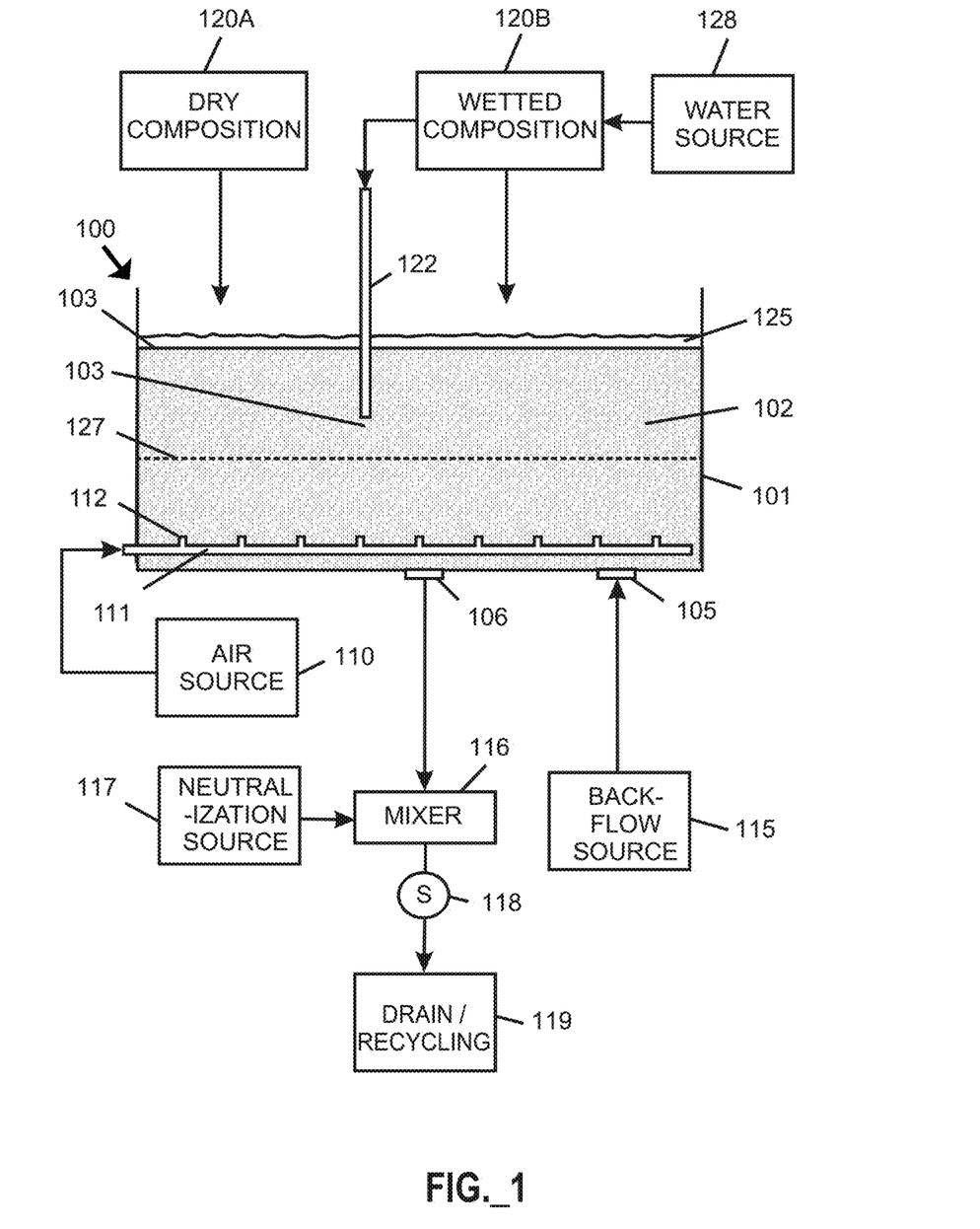
FIG. 1 is a schematic view of various components of a water filtration system including a water filtration bed (shown in cross-sectional view) arranged to receive a composition for removing surface contaminants from filtration media of the water filtration bed.

FIG. 1 is a schematic view of various components of a water filtration system 100 including a water filtration bed 101 being arranged to receive a composition for removing surface contaminants from filtration media 102 within the water filtration bed 101. The filtration bed 101 includes an air scour conduit 111 having multiple outlets 112 within the filtration bed 101 to deliver pressurized air from an air source 110 to the filtration bed. The filtration bed 101 further includes a backflow inlet 105 arranged to receive water from a backflow source 115, and an outlet 106 arranged to permit water from the filtration bed 101 to be drained to a drain or recycling apparatus 119. Interposed between the outlet 106 and the drain or recycling apparatus 119 are an optional mixer 116 (arranged to receive neutralizing chemical from neutralizing source 117 for mixing with effluent) and a sensor (e.g., colorimetric sensor) 118. A cleaning composition may be supplied to the filtration bed 101 from either a dry composition source 120A or a wetted composition source 120B. The wetted composition source 120B may be arranged to receive water from a water source 128. A wetted composition may be supplied to the filtration bed 101 along a top surface 103 thereof and/or via injection to at least one subsurface region 103 using at least one injection conduit 122. One advantage of injecting composition into a subsurface region 103 of the filtration media 102 is that such injection may agitate the filtration media 102 and ensure that unreacted composition with high concentration may contact subsurface filtration media 102. In certain embodiments, multiple injection conduits 122 may be used, or a single conduit 122 may be periodically moved to effectuate injection of composition at different subsurface locations. As shown in FIG. 1, composition 125 may initially form a layer along the top surface 103, but upon interaction with water already present in the filtration bed 101 (or otherwise supplied to the filtration bed), the composition 125 will form an advancing front 127 that migrates (e.g., downward) through the filtration media 102.

After composition 125 is added to filtration media 102 in the filter bed 101, the composition is preferably maintained in the filter bed 101 for a resting period (e.g., 12-48 hours or more). Periodically during the resting period, air may be injected from the air source 110 through the air scour conduit 111 and outlets 112 into the filtration media 102. Such air injection may aid in agitating filtration media 102, thereby potentially loosening deposits and/or permitting a greater degree of surface interaction between components of the composition and the filtration media 102. Since not all filter beds include air scour apparatuses, in certain embodiments, air may be injected into a filter bed using one or more insertable (e.g., temporary) air injection conduits or wands. After the resting period is complete, the filter bed 101 may be backwashed by opening inlet and permitting introduction of water from the backflow source 115. At the same time, the outlet 106 may be opened to permit effluent to be discharged from the filter bed 102. The effluent may be neutralized with neutralization chemical supplied by neutralization source 117 to an optional mixer 116. If the cleaning composition includes a pH indicator arranged to exhibit at least one change in color responsive to change in pH within an acidic pH range, then color of effluent may be monitored during backwashing (e.g., using a colorimetric sensor 118, or human observation) to determine presence or absence of color attributable to the pH indicator component, and either conducting or terminating treatment of effluent may be performed responsive to the color monitoring. A cleaning process using a composition as disclosed herein may then be terminated or repeated as necessary to obtain the desired degree of contaminant removal.

Figure 2:
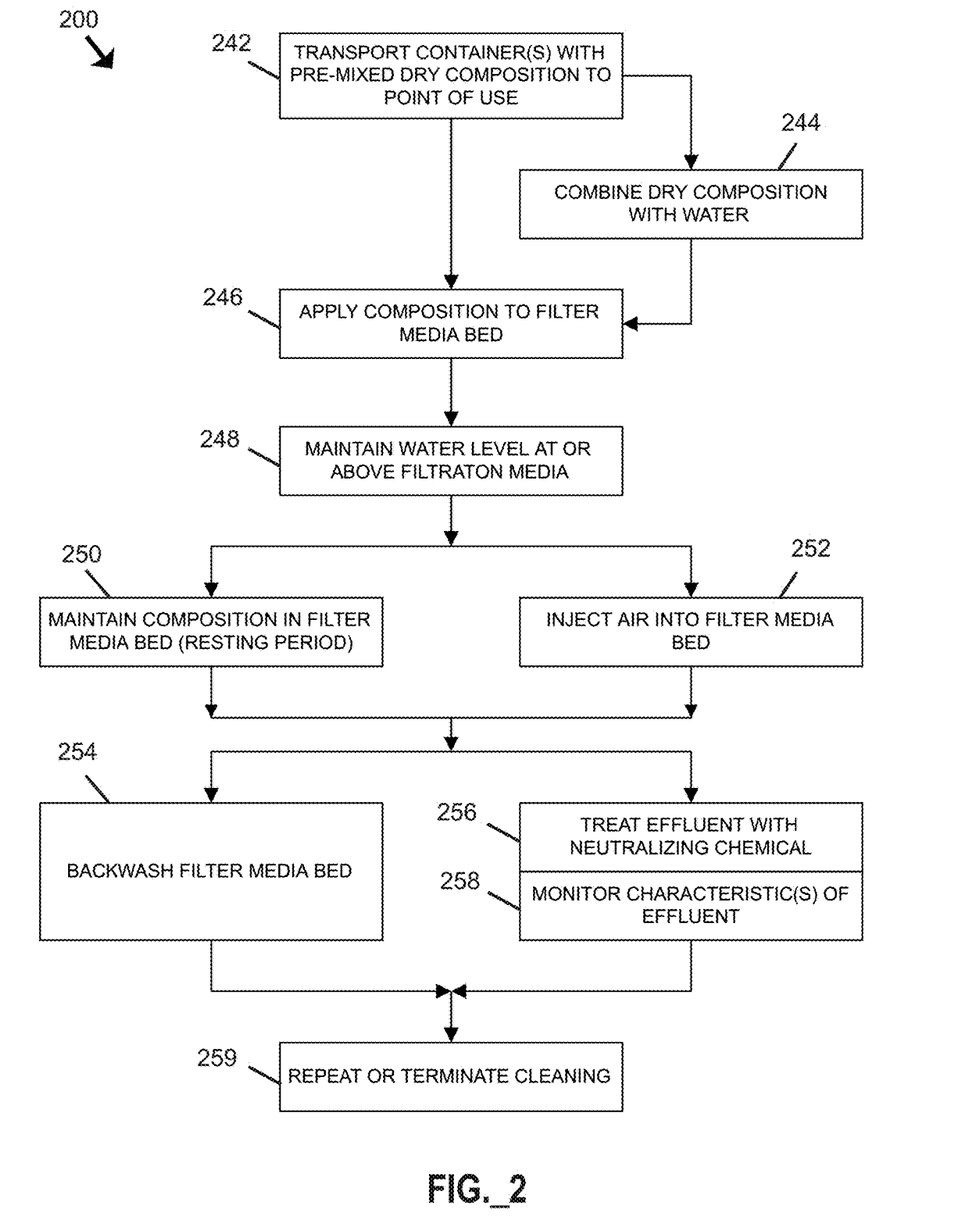
FIG. 2 is a flowchart showing various steps of methods for removing contaminants from water filtration media contained in a filter media bed using a composition as disclosed herein.

FIG. 2 is a flowchart showing various steps of at least one method 200 for removing contaminants from water filtration media contained in a filter media bed using a composition as disclosed herein. A first step 242 includes transporting one or more (e.g., substantially sealed) containers with pre-mixed dry composition to a point of use. If it is desired to administer media to a filtration bed in wetted form, the dry composition may be combined with water at the point of use according to step 244. Whether the composition is to be applied in dry or wetted form, the composition is applied to filtration media in a filter media bed according to step 246. Preferably, water level is maintained at or above the filtration media according to step 248. Thereafter, the composition is maintained in the filter media bed during a resting period according to step 250. During the resting period, air may be periodically injected into the filter media bed (e.g., using an air scouring apparatus) according to step 252. Following the resting period, the filtration bed may be backwashed and drained according to step 254, and at the same time effluent is preferably treated with neutralizing chemical according to step 256, and one or more characteristics (e.g., color) of the effluent may be monitored according to step 258 (wherein treatment or conducting treatment of effluent may be performed responsive to the monitoring). Thereafter, cleaning may be terminated or repeated according to step 259. Although not shown in FIG. 2, in preferred embodiments a filter media bed is backwashed immediately prior to application of composition to the filter media bed. It is to be appreciated that additional steps or fewer steps relative to those shown in FIG. 2 may be performed according to certain embodiments.

Figure 3:
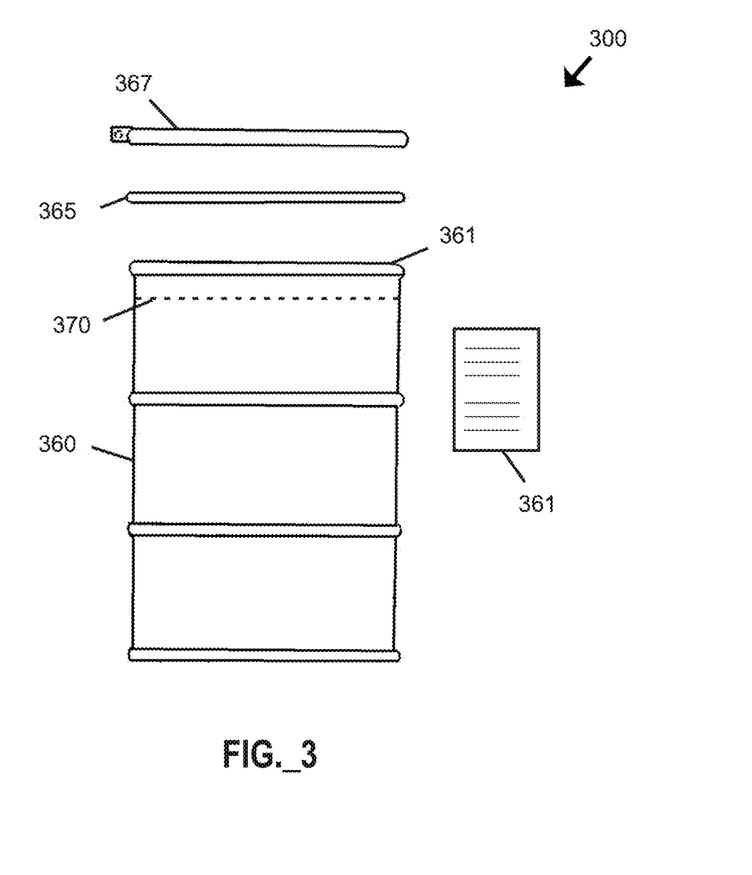
FIG. 3 is an elevation view of a kit including a dry composition as disclosed herein within a sealable container and including instructions (or indicia) for removing contaminants from water filtration media in a filter media bed using the dry composition.

FIG. 3 illustrates a kit 300 including a dry composition 370 as disclosed herein within a sealable container 360 (with lid 365 and closure or auxiliary seal 367) and including instructions 361 for removing contaminants from water filtration media in a filter media bed using the dry composition 370. In certain embodiments, the instructions 361 may be affixed to, contained in, or otherwise associated with the container 360. In certain embodiments, the container 360 labeled or otherwise provided with indicia (such as a Web address or QR code) that may permit a user to retrieve instructions for cleaning water filtration media using the composition. The kit 300 may be transported to a point of use and then opened immediately prior to use. The composition 370 may then be used according to the content of the instructions 361 (or instructions retrieved by indicia) for cleaning filtration media in a water filter bed as disclosed previously herein. Although the container of FIG. 3 is illustrated as a substantially rigid container (e.g., a drum), it is to be appreciated that compositions disclosed herein may be contained in any suitable types of substantially rigid or non-rigid containers, including but not limited to bags, pouches, cans, drums, boxes, bag-in-box combinations, bag-in-drum combinations, and the like. In preferred embodiments, a container containing a composition as disclosed herein is substantially sealed, so as to minimize entry of air and/or water vapor. In certain embodiments, a container as disclosed herein may be pressurized with an inert gas such as dry nitrogen, argon, or the like, in order to displace air and/or water vapor, and to ensure that any small leakage path would at least initially result in escape of dry gas rather than infiltration of ambient gas (e.g., vapor-containing air), in order to maintain the composition within the container in a dry condition.

Embodiments as disclosed herein may provide one or more of the following beneficial technical effects: ensuring correct proportions of acid and oxidizer are consistently used when performing in situ cleaning of water filtration media in a filter bed; facilitating easier and/or more uniform application of acid and oxidizer to water filtration media in a filter bed; reducing application problems associated with limited solubility acids of prior compositions for cleaning water filtration media; promoting complete cleaning of the entire volume of filtration media contained in a filter bed; avoiding need to transport large volumes of liquid chemicals; permitting monitoring of progress of one or more steps of a filtration bed cleaning process; reducing time required to perform filtration bed cleaning; and avoiding use of hazardous or non-NSF-certified chemicals for filtration bed cleaning.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. A dry composition for use in removing surface contaminants from filtration media contained in a water filter media bed, the dry composition comprising:
    a granular acid component comprising sodium bisulfate; and
    a granular oxidizing component comprising at least one of sodium percarbonate, sodium perborate, potassium percarbonate, or potassium perborate;
    wherein the dry composition comprises at least one of the following features (i) or (ii):
    (i) a pH indicator component arranged to exhibit at least one change in color responsive to change in pH within an acidic pH range; or
    (ii) the dry composition comprises at least 80 wt % sodium bisulfate and at least 5 wt % of at least one of sodium percarbonate, potassium percarbonate, potassium perborate, or sodium perborate.

2. A dry composition according to claim 1, comprising a pH indicator component arranged to exhibit at least one change in color responsive to change in pH within an acidic pH range.

3. A dry composition according to claim 2, wherein the granular acid component, granular oxidizing component, and pH indicator component are mixed and in dry form.

4. A dry composition according to claim 1, wherein the sodium bisulfate and at least one of sodium percarbonate, potassium percarbonate, potassium perborate, or sodium perborate are present in the dry composition in a ratio of from about 8:1 to about 15:1 by weight of sodium bisulfate relative to the at least one of sodium percarbonate, potassium percarbonate, potassium perborate, or sodium perborate.

5. A dry composition according to claim 1, wherein the dry composition comprises at least 80 wt % sodium bisulfate and at least 5 wt % of at least one of sodium percarbonate, potassium percarbonate, potassium perborate, or sodium perborate.

6. A dry composition according to claim 1, further comprising a granular low temperature activator adapted to promote conversion of liquid hydrogen peroxide to peracetic acid at temperatures within a range of from 5° C. to 30° C., wherein the granular low temperature activator comprises sodium 2-[[(4-sulfophenoxy)carbonyl]oxy]ethyl ester (DE-COBS).

7. A dry composition according to claim 1, further comprising a granular low temperature activator adapted to promote conversion of liquid hydrogen peroxide to peracetic acid at temperatures within a range of from 5° C. to 30° C., wherein the granular low temperature activator comprises sodium nonanoyloxybenzenesulfonate (NOBS).

8. A dry composition according to claim 6, wherein at least one of sodium percarbonate or sodium perborate, and the granular low temperature activator, are present in the dry composition in a ratio of from about 1:1 to about 4:1 by weight of the at least one of sodium percarbonate, potassium percarbonate, potassium perborate, or sodium perborate relative to the granular low temperature activator.

9. A dry composition according to claim 1, further comprising at least one dessicant.

10. A dry composition according to claim 1, further comprising at least one anti-caking agent.

11. A dry composition according to claim 1, wherein the granular oxidizing component comprises sodium percarbonate.

12. A dry composition according to claim 1, wherein the granular oxidizing component comprises sodium perborate.

13. A dry composition according to claim 1, wherein the granular acid component consists essentially of sodium bisulfate.

14. A dry composition according to claim 1, wherein the granular oxidizing component consists essentially of at least one of sodium percarbonate, sodium perborate, potassium percarbonate, or potassium perborate.

15. A kit comprising:
    a substantially sealed container containing a dry composition according to claim 1 for use in removing surface contaminants from filtration media contained in a filter media bed; and
    instructions or indicia for supplying the dry composition to a filter media bed containing filtration media comprising one or more of sand, anthracite coal, granular activated carbon, gravel, manganese greensand, ion exchange resin, or ceramic beads and removing contaminants from the filtration media in the water filter media bed using the dry composition.

16. A method of removing contaminants from water filtration media contained in a filter media bed, the method comprising applying to the filter media bed a composition comprising:
    an acid component comprising sodium bisulfate; and
    an oxidizing component comprising at least one of sodium percarbonate, sodium perborate, potassium percarbonate, or potassium perborate;
    wherein the composition comprises at least one of the following features (i) or (ii):
    (i) the composition when in dry form comprises at least 80 wt % sodium bisulfate and at least 5 wt % of the at least one of sodium percarbonate, sodium perborate, potassium percarbonate, or potassium perborate; or (ii) the composition comprises a pH indicator component arranged to exhibit at least one change in color responsive to change in pH within an acidic pH range.

17. A method according to claim 16, wherein the composition when in dry form comprises at least 80 wt % sodium bisulfate and at least 5 wt % of the at least one of sodium percarbonate, sodium perborate, potassium percarbonate, or potassium perborate.

18. A method according to claim 16, wherein the composition comprises a pH indicator component arranged to exhibit at least one change in color responsive to change in pH within an acidic pH range.

19. A method according to claim 16, wherein the composition is applied to the filter media bed in granular form.

20. A method according to claim 19, wherein a water level is maintained at or above an upper surface of the water filtration media while the composition is applied to the filter media bed.

21. A method according to claim 16, wherein the composition is applied on or over a top surface of the water filtration media contained in the filter media bed.

22. A method according to claim 16, further comprising mixing the composition with water to form a wetted composition, wherein the composition is applied to the filter media bed in wetted form.

23. A method according to claim 22, wherein the wetted composition is applied to the filter media bed by injection into one or more subsurface regions of the filter media bed.

24. A method according to claim 18, wherein the pH indicator component is arranged to undergo a color change within a pH range of between 1 and 3.

25. A method according to claim 16, further comprising utilizing an air scour system to inject air into the filter media bed while the composition is present in the filter media bed.

26. A method according to claim 16, further comprising:
maintaining the composition in the filter media bed for a resting period of at least about 12 hours; and
after the resting period, backwashing the filter media bed and treating effluent obtained by backwashing the filter media bed with a neutralizing chemical.

27. A method according to claim 26, further comprising injecting air into the filter media bed during the resting period.

28. A method according to claim 26, wherein the composition further comprises a pH indicator component arranged to exhibit at least one change in color responsive to change in pH within an acidic pH range, and the method further comprises:
monitoring color of the effluent for presence or absence of color attributable to the pH indicator component; and
conducting or terminating treatment of the effluent responsive to said monitoring of color of the effluent.

29. A method according to claim 16, wherein the water filtration media comprises at least one of sand, gravel, manganese greensand, or anthracite coal.

30. A method according to claim 16, wherein the water filtration media comprises at least one of granular activated carbon (GAC), ion exchange media, or ceramic beads.

* * * * *